No. 773,295. PATENTED OCT. 25, 1904.
T. S. MILLER.
CABLEWAY.
APPLICATION FILED JAN. 6, 1903. RENEWED MAY 17, 1904.
NO MODEL.
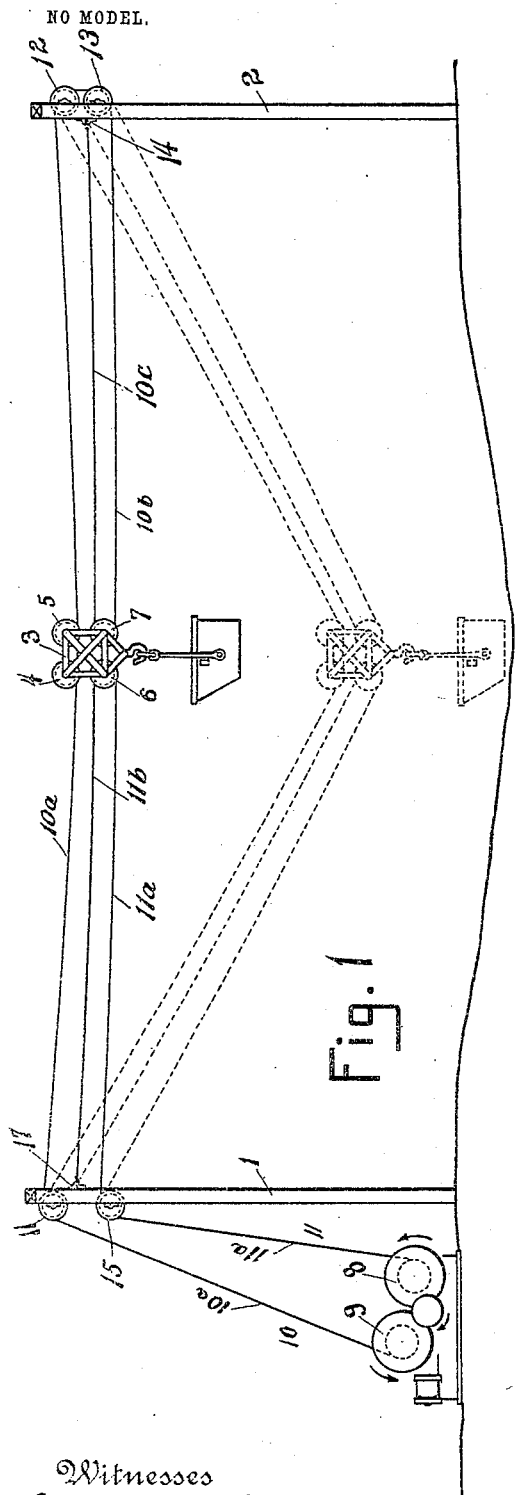
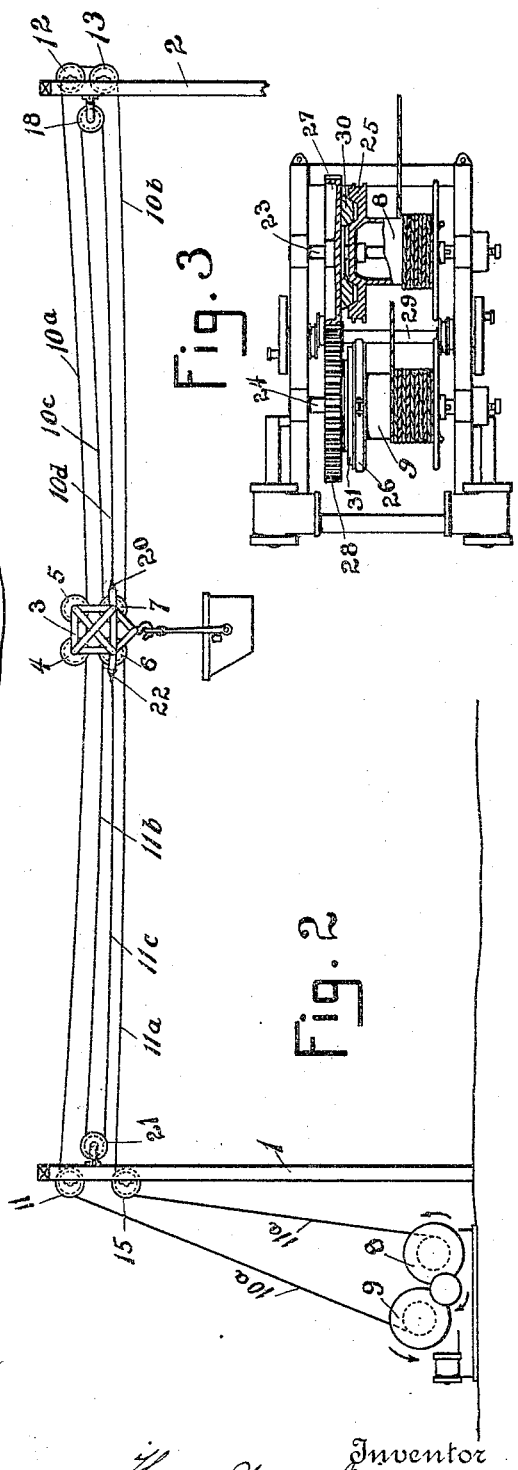
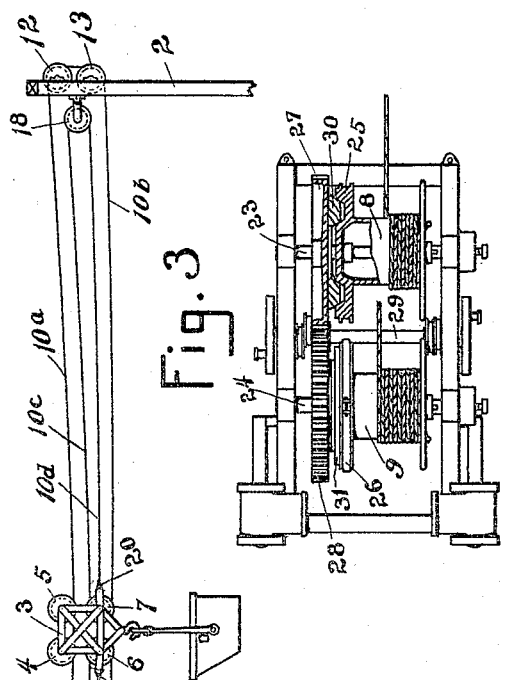
Witnesses
Richard W. Seabury
Walter A. Pauling
Inventor
Thomas Spencer Miller
By his Attorneys
Gifford & Bull No. 773,295. Patented October 25, 1904.

UNITED STATES PATENT OFFICE.

THOMAS SPENCER MILLER, OF SOUTH ORANGE, NEW JERSEY.

CABLEWAY.

SPECIFICATION forming part of Letters Patent No. 773,295, dated October 25, 1904.

Application filed January 6, 1903. Renewed May 17, 1904. Serial No. 208,472. (No model.)

*To all whom it may concern:*

Be it known that I, THOMAS SPENCER MILLER, a citizen of the United States, and a resident of South Orange, county of Essex, and State of New Jersey, have invented a new and useful Improvement in Cableways, of which the following is a specification.

One object of this invention is to construct a cableway whereby a load may be raised and conveyed by the employment of only two rope-operating members and by ropes of comparatively small gages and with little, if any, difference in gage between the different ropes.

In the accompanying drawings, Figure 1 is the side view of one form of my apparatus, showing the lowered position of the load in dotted lines. Fig. 2 is the side view of another form of the same. Fig. 3 is the plan view of the reversible rope-drum engine in detail.

1 is the head-support; 2, the tail-support; 3, the load-carriage containing the sheaves 4, 5, 6, and 7.

8 and 9 are the two rope-drums.

10 is a rope secured at one end to the rope-drum 9 and extending thence over the head-support sheave 11, around the tail-support sheaves 12 and 13, and around the load-carriage sheave 7 to the point of attachment 14 at the tail-support. The runs of the rope 10 on the span are indicated as $10^a$, $10^b$, and $10^c$. The load-carriage sheaves 4 and 5 rest on the run $10^a$. Another rope is secured at one end to the drum 8 and extends thence in the run $11^a$ over the head-support sheave 15 to and around the load-carriage sheave 6 and in the run $11^b$ back to the head-support, where it is made fast at 17.

In the modification shown in Fig. 2 each rope has an additional run on the span designated, respectively, as $10^d$ and $11^e$. In other words, the rope 10 extends from the load-carriage sheave 7 around the tail-support sheave 18 and back to the point of attachment 20 on the load-carriage. The rope 11 extends from the load-carriage sheave 6 around the head-support sheave 21 and back to the point of attachment 22 on the load-carriage.

The rope-drum engine shown in Fig. 3 contains the two rope-drums 8 and 9, which are revolubly loose upon the shafts 23 and 24 and are capable of being held from rotation by band-brakes applied at 25 and 26. Fixed to these shafts are the spur-wheels 27 and 28, driven from the same pinion on shaft 29. A friction-clutch 30 is interposed between the spur-wheel 27 and drum 8 and a friction-clutch 31 between the spur-wheel 28 and drum 9. When both clutches are set, the running of the engine in the direction of the arrows of Fig. 1 will convey the load toward the tail and in the reverse direction toward the head. When both clutches are unset and both drums allowed to pay out under the control of their brakes, the load may be permitted to descend in a vertical line, as indicated in Fig. 1. The load may be made to descend in a diagonal line directed either toward the tail or head support by paying out from one drum faster than from the other. With the clutch set on one drum and the brake set on the other the load will be raised.

In both modifications shown the sheaves 6 and 7 constitute, in effect, two movable pulleys secured to the load-carriage and which are respectively connected by manifolded ropes with the head and tail supports. The elevation of the load-carriage is thus controlled substantially by two inversely-operating multipurchase tackles and therefore without excessive engine-power. The two load-carriage wheels 4 and 5 by their engagement with the rope-run $10^a$ not merely assist in supporting the carriage, but also in steadying it and preventing it from upsetting.

Having thus described my invention, I claim as new and desire to secure by Letters Patent—

1. In a ropeway, in combination, a load-carriage and two inversely-operating multipurchase tackles by which the load-carriage is suspended between the head and tail supports, and an engine at one end of the ropeway by which the ropes of both tackles are operated.

2. In a ropeway, in combination, a load-carriage, two inversely-operating multipurchase tackles by which the load-carriage is suspended between the head and tail supports and a rope-run extending between said supports with which the load-carriage engages and which operates the tackle extending to the tail-support.

3. In a hoisting and conveying device, in combination, an engine having two hauling devices, head and tail supports having sheaves, a load-carriage, a rope leading from one hauling device over a head-sheave under a load-carriage sheave about a tail-sheave about a load-carriage sheave and to the tail-support, another rope leading from the other hauling device over a head-sheave, about a load-carriage sheave to the head-support.

4. In a hoisting and conveying apparatus, in combination the head and tail supports, an engine containing two rope-drums and two friction-clutches for driving the same, a load-carriage and two ropes actuated inversely by said rope-drums whereby said load-carriage is suspended; one of said ropes extending from the head-support under a running engagement on the carriage to the tail-support and back to the carriage, and the other of said ropes extending from the head-support to the carriage.

5. In a hoisting and conveying apparatus in combination, the head and tail supports, the load-carriage, an engine containing two rope-drums and two friction-clutches for driving the same, two connected sheaves 6 and 7, two ropes actuated inversely by said rope-drums whereby said connected sheaves and said load-carriage are suspended; one of said ropes extending from the head-support outward to the tail-support, inward around said sheave 7 and outward to the tail-support and the other of said ropes extending from the head-support outward around said sheave 6 and inward to the head-support.

In testimony whereof I have hereunto signed my name in the presence of two subscribing witnesses.

THOMAS SPENCER MILLER.

Witnesses:
CHAS. G. MUNIER,
J. J. DERRICK.